Nov. 18, 1969 R. T. CORNELIUS 3,478,929
MEANS FOR DECARBONATING AND DISPENSING A BEVERAGE
Filed March 5, 1965
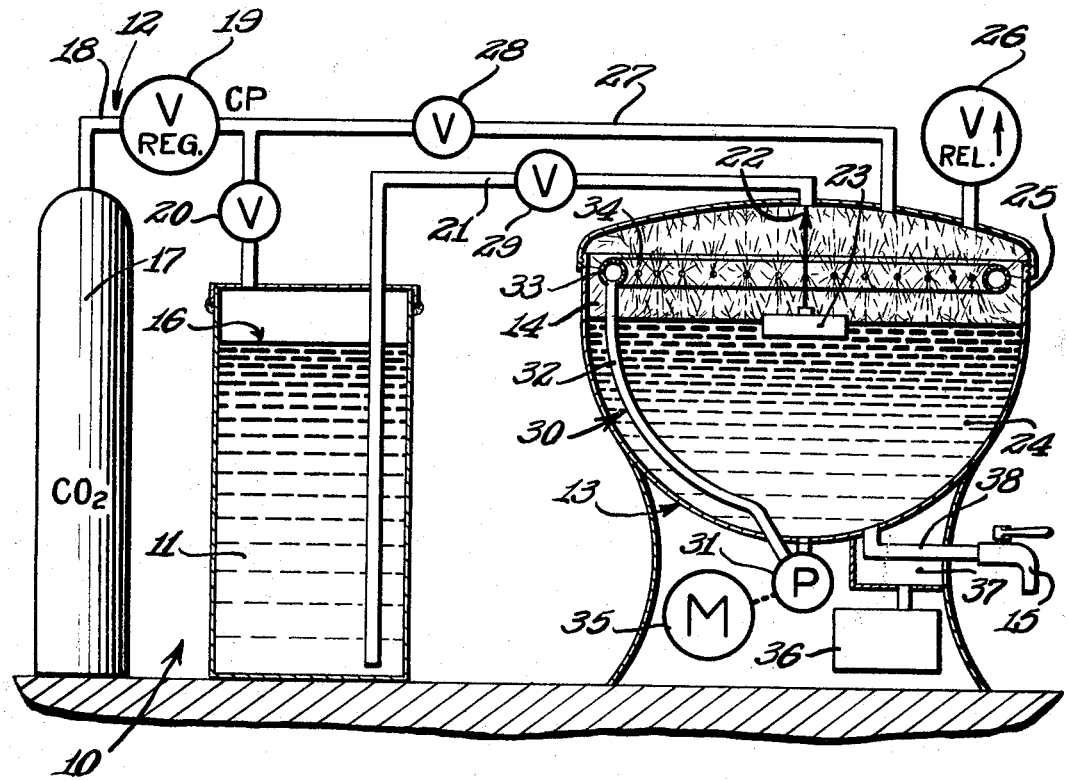
INVENTOR.
Richard T. Cornelius
BY
ATTORNEYS United States Patent Office 3,478,929
Patented Nov. 18, 1969

3,478,929
MEANS FOR DECARBONATING AND
DISPENSING A BEVERAGE
Richard T. Cornelius, Minneapolis, Minn., assignor to
The Cornelius Company, Anoka, Minn., a corporation
of Minnesota
Continuation-in-part of abandoned application Ser. No.
352,051, Mar. 16, 1964. This application Mar. 5, 1965,
Ser. No. 446,450
Int. Cl. B67d 5/56, 5/54; A23l 3/00
U.S. Cl. 222—129.1        6 Claims

ABSTRACT OF THE DISCLOSURE

A method and apparatus for preserving and dispensing fresh fruit juice which includes continually recirculating a previously-carbonated quantity of the juice so as to decarbonate the same within the dispenser, the quantity of juice being decarbonated, prior to being dispensed, being subject to an atmosphere of carbon dioxide or nitrogen obtained independently of the carbonated juice, the transfer to the decarbonating chamber being automatic.

---

This application is a continuation-in-part of my co-pending application U.S. Ser. No. 352,051, filed Mar. 16, 1964, which is abandoned with the filing of this application.

This invention relates to a means for dispensing a decarbonated or non-carbonated beverage, and more specifically to a means for preserving fresh fruit juice against deterioration in a dispenser, in which a decarbonated or non-carbonated fruit juice is dispensed from a source of carbonated or non-carbonated fruit juice.

In order to merchandise fruit juices or other beverages, such as those made from fresh fruits, in an effective manner, it has been the practice to provide a dispenser having a transparent juice storage chamber within which the juice is agitated in a suitable manner to prevent the settling of pulp and to enhance the appearance of the product. Such juice has therefore been subjected to aeration incidentally to such agitation, which aeration has accelerated the deterioration or spoilage of the beverage in the dispenser.

According to the present invention, a means is provided by which an inert gas such as carbon dioxide gas or nitrogen gas is employed in an effective manner to minimize or eliminate such deterioration, the beverage being dispensed in a substantially decarbonated or non-carbonated condition.

Accordingly, it is an object of the present invention to provide a means for preserving fresh fruit juice against deterioration in a dispenser.

A further object of the present invention is to provide a means for dispensing a decarbonated fruit juice from a source of carbonated fruit juice.

A still further object of the present invention is to provide apparatus for dispensing a decarbonated or non-carbonated beverage.

Yet another object of the present invention is to provide a means by which an inert gas such as carbon dioxide gas or nitrogen gas is used to purge air from a dispenser to prevent beverage therein from being exposed to air and subsequent deterioration.

Many other advantages, features and additional objects of the present invention will become manifest to those versed in the art upon making reference to the detailed description and the accompanying drawing sheet in which a preferred structural embodiment incorporating the principles of the present invention is shown by way of illustrative example.

On the drawing:

The drawing is a diagrammatic view of a system for preserving a fruit juice beverage within a dispensing system, provided in accordance with the principles of the present invention.

As shown on the drawing:

The principles of the present invention are particularly useful when embodied in a fruit juice dispensing system such as illustrated in the drawing, generally indicated by the numeral 10. The dispensing system 10 includes a storing means 11 for the fruit juice, pressurizing means generally indicated at 12 for applying pressurized inert gas such as carbon dioxide gas or nitrogen gas to such fruit juice, a dispenser generally indicated at 13 and having a chamber 14 in which the juice is agitated, and a dispensing valve 15 communicating with the chamber 14.

The storing means 11 comprises a tank in which there is disposed a supply of fruit juice 16 in which there has been previously dissolved a substantial quantity of carbon dioxide gas. The juice in such bulk storage therefore constitutes previously carbonated fruit juice. The apparatus may also be used to advantage when the supply of fruit juice 16 is non-carbonated.

The pressurizing means 12 includes a gas cylinder 17 in which there is a quantity of highly pressurized inert gas such as carbon dioxide gas or nitrogen gas. The cylinder 17 communicates by means of a line 18 with a pressure regulator valve 19 which is set to provide a pressure suitable for propelling carbonated or non-carbonated fruit juice 16, and for maintaining the carbonation of the supply of carbonated fruit juice 16. Preferably, a manually operable valve 20 is provided between the regulator valve 19 and the tank 11 for facilitating replacement of the tank 11 with a similar full tank. The gas pressure in the storing means or tank 11 is substantially constant, for example between 40 to 60 p.s.i., and the gas serves to preserve and to propel or expel the fruit juice 16.

The dispenser chamber 14 receives a portion of the supply 16 of carbonated or non-carbonated fruit juice through a line 21 which extends to the lower portion of the tank 11 and which opens into or discharges into the upper portion of the chamber 14. Suitable means are provided to regulate the admission of additional carbonated or non-carbonated fruit juice to the chamber 14. In the drawing there is schematically shown a normally closed valve 22, the position of which is under the control of a float 23, the height of which is controlled by the level of fruit juice 24 disposed in the chamber 14. Thus, the normally closed means 22 controls the flow of juice automatically from the supply 16 to the chamber 14 through the fluid connection 21, in accordance with demand.

The normally closed means 22 is operative to reduce the pressure on the juice flowing through the line 21 as it flows past such means 22. Preferably the means 22 is so constructed as to create a high degree of turbulence in the juice as it enters the chamber 14, thereby agitating or spraying it into the chamber 14. The reduction in pressure on that portion of the supply of fruit juice which is transferred, which reduction in pressure is effected by the means 22, aids in rendering carbonated juice unstable in that it serves to cause dissolved carbon dioxide gas to be released or to leave or to be given off from such transferred portion. Thus, the decarbonation begins with the reduction of pressure and with the ensuing agitation or spray which further serves to cause the release of carbon dioxide gas from such portion. This transfer of juice into the chamber 14 continues until the chamber 14 is partially filled so as to cause the means 22, 23 to close the fluid connection line 21 automatically.

The chamber 14 is defined by means 25 which is so constructed as to be pressurizable, there being a relief valve 26 communicating with the chamber 14, the relief valve 26 being set so as to open or crack at a pressure within the chamber 14 which is above atmospheric pressure. The relief valve 26 thus retains inert gas including any release carbon dioxide gas in the space or portion of the chamber 14 lying above the juice 24 therein. This retained gas is thus maintained therein at a pressure above atmospheric, and any excess in such gas is vented to the atmosphere by the relief valve 26. Since the relief valve 26 is disposed so as to vent the upper portion of the chamber 14 there is a separation within the chamber 14 of any released gas, which rises, and the liquid, which settles.

The structure further includes a pressurizing and purging line 27 having a manually operated control or purging valve 28 communicating with the downstream side of a pressure regulator valve 40 upstream of the valve 20 (which valve 40 is connected to the downstream side of the regulator valve 19) and with the chamber defining means 25 for selectively admitting gas from the cylinder 17 into the chamber 14. The air within the chamber 14 may initially be purged out of such chamber by such inert purging gas which thus is vented to the atmosphere by the relief valve 26, a portion of such purging gas being retained therein so that the entire internal atmosphere is an inert gas. Alternatively, carbonated fruit juice may be first transferred into the chamber 14 by the opening of a normally open manually controllable valve 29. Although some purging will thus take place automatically, the valve 28 may thereafter be opened to insure a reasonably pure atmosphere of carbon dioxide gas, nitrogen gas, or a mixture thereof in the space above the fruit juice.

The system 10 further includes means for substantially totally decarbonating the carbonated fruit juice for imminent consumption. In this embodiment, such decarbonating means comprises further means for physically agitating the portion 24 of fruit juice which has been admitted into the chamber 14. Such agitation is provided by circulating means generally indicated at 30 which includes a pump 31 which continually withdraws juice from the chamber 14 and propels it through a line 32 to a suitable spray member 33 which is suitably apertured of nozzle to discharge the juice as a spray 34. Such handling or circulation thus further acts to decarbonate the fruit juice in the chamber 14 in a continual manner. Since there is virtually no oxygen present in the upper portion of the chamber, such "aeration" in an oxygen-free or inert atmosphere precludes deterioration due to conventional aeration, and the aerating circulating means that has been a prime factor in causing previous deterioration is thus employed in a preferred form of this invention to release a protective quantity of carbon dioxide gas into the chamber to preclude such deterioration, while retaining the visual enhancement of the beverage in the dispenser 13.

The pump 31 is driven by a motor 35 disposed in the base of the dispenser 13.

If desired, a temperature control system 36 may be employed with a heat exchange jacket 37 associated with a line 38 leading to the dispensing valve 15, for lowering or raising the temperature of the juice 24 in the dispensers 13.

Although the present invention is specifically advantageous with fruit juice, the disclosed apparatus may be used to advantage to dispense other normally non-carbonated beverages by decarbonating a carbonated supply thereof.

In a preferred form, the process of this invention includes the use of carbon dioxide gas in the tank 17 and a highly carbonated beverage 16 in the tank 11 which is dispensed at the valve 15 as a decarbonated beverage. In such operation, the regulator valve 40 may be omitted and the valve 28 left normally closed, as sufficient inert gas will be released during decarbonation in the chamber 14. The relief valve 26 could then be set slightly above atmospheric pressure.

If the beverage 16 is lightly carbonated, the regulator valve 40 and valve 28 should be set so as to supplement the gas release by decarbonation, and to prevent a waste of the supplemental gas, the relief valve 26 should be set to crack at a pressure above the setting of the regulator valve 40, which typically may be as low as 5 p.s.i. under this condition so as to effect proper dispensing of the beverage.

With either a highly or lightly carbonated beverage supply 16, the inert gas supply 17 may thus comprise nitrogen, which would mix in the chamber 14 with carbon dioxide gas released by decarbonation. Again the regulator valve 40 would typically have a similar setting.

With a non-carbonated beverage supply 16, the inert gas supply 17 may thus comprise carbon dioxide gas or nitrogen gas, with the regulator valve 40 set as before, and then being part of the sole means by which an inert gas is supplied to the chamber 14.

By use of carbon dioxide gas, preservation is kept at a maximum, while by use of nitrogen gas, foaming is kept at a minimum, but more importantly, the possibility that beverage will absorb $CO_2$ from above is eliminated, and hence overcarbonation during extended storage is eliminated.

Although various minor modifications might be suggested by those versed in the art, it should be understood that I wish to embody within the scope of the patent warranted hereon all such embodiments as reasonably and properly come within the scope of my contribution to the art.

I claim as my invention:

1. Apparatus for dispensing a decarbonated beverage, comprising:
   (a) means defining a pressurizable chamber receptive of carbonated beverage;
   (b) purging means connectible to a supply of carbon dioxide gas, and operative to conduct only gas directly to said chamber to purge said chamber with said gas;
   (c) a relief valve communicating with said chamber and operative to retain gas therein;
   (d) means operative on beverage in said chamber to cause it to release substantially all its dissolved carbon dioxide gas into said chamber; and
   (e) a dispensing valve communicating with said chamber.

2. Apparatus for dispensing a decarbonated beverage from a supply of carbonated beverage, comprising:
   (a) means for storing a supply of carbonated beverage;
   (b) means for applying a substantially constant pressure of carbon dioxide gas to said storing means;
   (c) means defining a pressurizable chamber having a fluid connection with said storing means;
   (d) a line separate from said fluid connection and having a valve and connecting said pressure-applying-means to said chamber for selective purging thereof with carbon dioxide gas;
   (e) a relief valve communicating with said chamber and operative to retain gas therein;
   (f) means operative on beverage in said chamber to cause it to give off substantially all its carbon dioxide gas; and
   (g) a dispensing valve communicating with said chamber.

3. Apparatus for dispensing a decarbonated beverage from a supply of carbonated beverage, comprising:
   (a) means defining a chamber closed to the atmosphere and having a connection for attachment to the supply of carbonated beverage;
(b) means communicating with said chamber for maintaining carbon dioxide gas therein at a pressure below the partial pressure of the carbon dioxide in the supply;
(c) means for continually recirculating only the carbonated beverage in said chamber in such a manner as to cause it to give off substantially all its carbon dioxide gas in said chamber without effect on the supply of carbonated beverage; and
(d) a dispensing valve communicating with beverage in said chamber.

4. Apparatus for dispensing a decarbonated beverage from a supply of carbonated beverage, comprising:
(a) means defining a chamber closed to the atmosphere and having a connection for attachment to the supply of carbonated beverage;
(b) means communicating with said chamber for maintaining carbon dioxide gas therein at a pressure below the partial pressure of the carbon dioxide in the supply;
(c) a spray member disposed in said chamber;
(d) means for continually recirculating only beverage from said chamber through said spray member so as to decarbonate the beverage while in said chamber without effect on the supply of carbonated beverage; and
(e) a dispensing valve communicating with said chamber.

5. Apparatus for dispensing decarbonated fruit juice, comprising:
(a) means for storing a supply of carbonated fruit juice;
(b) means for applying a high enough pressure of carbon dioxide gas to said storing means to preserve the carbonation of the fruit juice;
(c) a chamber having means communicating with said storing means and receptive of a portion of the supply of carbonated fruit juice therefrom, and operative to physically agitate said portion under such pressure as to effect decarbonation thereof;
(d) means for continually recirculating such fruit juice in said chamber for providing additional physical agitation thereof enroute to said chamber to effect further decarbonation; and
(e) a dispensing valve communicating with said chamber.

6. Apparatus for dispensing decarbonated fruit juice, comprising:
(a) means for storing a supply of carbonated fruit juice;
(b) means for applying a high enough pressure of carbon dioxide gas to said storing means to preserve the carbonation of the fruit juice;
(c) means defining a chamber operative at a decarbonation pressure slightly above atmospheric pressure and having a fluid connection with said storing means;
(d) normally closed means for automatically controlling the flow of carbonated fruit juice through said fluid connection into said chamber, and operative to reduce the pressure on juice flowing therethrough;
(e) recirculating means so continually operative on such fruit juice in said chamber under such carbon dioxide chamber pressure as to cause it to give off substantially all its carbon dioxide gas while in said chamber;
(f) a relief valve communicating with said chamber and operative to retain therein carbon dioxide gas released from said juice up to said decarbonation pressure; and
(g) a dispensing valve communicating with said chamber.

References Cited
UNITED STATES PATENTS

| | | | |
|---|---|---|---|
| 2,017,664 | 10/1935 | Leins | 222—397 X |
| 2,726,017 | 12/1955 | Burden | 222—318 X |
| 3,225,965 | 12/1965 | Jacobs et al. | 222—318 X |
| 3,113,871 | 12/1963 | Webster | 99—155 |
| 2,793,125 | 5/1957 | Keller | 99—155 |

OTHER REFERENCES

Morgan et al.: "Effect of Carbon Dioxide and Certain Other Chemicals on the Keeping Quality of Single Strength and Concentrated Orange Juice," Florida State Horticultural Society Proceedings, vol. LXVII, 1954, pp. 166–170.

ROBERT B. REEVES, Primary Examiner

HADD S. LANE, Assistant Examiner

U.S. Cl. X.R.

99—155; 222—318, 397